(12) United States Patent
Fink

(10) Patent No.: US 10,102,777 B1
(45) Date of Patent: Oct. 16, 2018

(54) LABEL WITH PIVOTABLE COVER

(71) Applicant: Fastech, Inc., Canton, MA (US)

(72) Inventor: Matthew Fink, Weston, MA (US)

(73) Assignee: Fastech, Inc., Canton, MA (US)

( * ) Notice: Subject to any disclaimer, the term of this patent is extended or adjusted under 35 U.S.C. 154(b) by 0 days.

(21) Appl. No.: 14/630,321

(22) Filed: Feb. 24, 2015

(51) Int. Cl.
| | |
|---|---|
| *G09F 3/02* | (2006.01) |
| *B32B 7/08* | (2006.01) |
| *B32B 3/26* | (2006.01) |
| *B32B 3/10* | (2006.01) |

(52) U.S. Cl.
CPC ............. *G09F 3/02* (2013.01); *B32B 3/10* (2013.01); *B32B 3/266* (2013.01); *B32B 7/08* (2013.01); *B32B 2250/02* (2013.01); *B32B 2519/00* (2013.01); *G09F 2003/0282* (2013.01)

(58) Field of Classification Search
CPC ........................................................ A44B 1/14
USPC ................. 40/661.04, 315, 486, 492, 781, 6
See application file for complete search history.

(56) References Cited

U.S. PATENT DOCUMENTS

| | | | |
|---|---|---|---|
| RE6,279 E | 2/1875 | Dunham | |
| 373,243 A * | 11/1887 | Miller | ........... E04H 13/003 |
| | | | 40/124.5 |
| 653,267 A * | 7/1900 | Short | ............... G09F 3/202 |
| | | | 40/5 |
| 1,510,944 A | 10/1924 | Lassen | |
| 1,589,228 A | 6/1926 | Robb | |
| 1,591,263 A | 7/1926 | Aymer | |
| 1,723,130 A | 8/1929 | Burke | |
| 3,763,865 A | 10/1973 | DeFru | |
| D373,098 S | 8/1996 | Lee | |
| 6,122,829 A | 9/2000 | McHenry | |
| 6,149,496 A | 11/2000 | Fildan | |
| 6,354,031 B1 * | 3/2002 | Meur | ............... G09F 1/12 |
| | | | 40/732 |
| 6,793,556 B1 | 9/2004 | Fildan | |
| 7,507,141 B2 | 3/2009 | Ward | |
| D619,927 S | 7/2010 | Guyton | |

(Continued)

FOREIGN PATENT DOCUMENTS

EP          1736068 A1 * 12/2006    ............... A44B 1/14

*Primary Examiner* — Gary C Hoge
(74) *Attorney, Agent, or Firm* — Pryor Cashman LLP

(57) ABSTRACT

A label attachable to a fabric includes a plate member having a shape, a first end and a second end, the plate member having a plurality of holes therethrough disposed between the first end and the second end, the plate member having a pivot hole therethrough adjacent to the first end, and the plate member having a notch disposed adjacent to the second end; and a cover member having substantially the same shape as the plate member, a top surface, a bottom surface, a first end and a second end, the cover member having a pivot pin integrally formed therewith and projecting from the bottom surface adjacent to the first end, the pivot pin rotatably attached to the plate member through the pivot hole of the plate member, and the cover member having a protrusion configured to engage the notch of the plate member projecting from the bottom surface and disposed adjacent to the second end; wherein the cover member is pivotable with respect to the plate member and is substantially alignable with the plate member such that the protrusion of the cover member is engageable with the notch of the plate member.

21 Claims, 1 Drawing Sheet

(56) References Cited

U.S. PATENT DOCUMENTS

2005/0034480 A1 2/2005 Martz
2008/0010787 A1 1/2008 Kinskey

* cited by examiner

LABEL WITH PIVOTABLE COVER

TECHNICAL FIELD

The present invention relates generally to labels that may be attached to fabric items such as clothing, and particularly to labels for which the attachment mechanism is concealed or covered so that it is not visible.

BACKGROUND OF THE INVENTION

Labels for fabric are known in the art. The present invention represents an improved label for displaying a marking such as a word, logo or design, and having a concealed mechanism for attaching the label to a fabric item.

SUMMARY OF THE INVENTION

It is an object of the present invention to provide a label for displaying a design and having a concealed mechanism for attaching the label to a fabric item. For example, the present invention is applicable to the field of apparel.

In general, in one aspect, the invention features a label including a plate member having a shape, a first end and a second end, the plate member having a plurality of holes therethrough disposed between the first end and the second end, the plate member having a pivot hole therethrough adjacent to the first end, and the plate member having a notch disposed adjacent to the second end.

A cover member has substantially the same shape as the plate member, a top surface, a bottom surface, a first end and a second end, the cover member having a pivot pin integrally formed therewith and projecting from the bottom surface adjacent to the first end, the pivot pin rotatably attached to the plate member through the pivot hole of the plate member, and the cover member having a protrusion configured to engage the notch of the plate member projecting from the bottom surface and disposed adjacent to the second end. The cover member is pivotable with respect to the plate member and is substantially alignable with the plate member such that the protrusion of the cover member is engageable with the notch of the plate member.

Implementations of the invention may include one or more of the following features. The pivot pin may include a head fixedly attached to the pivot pin such that the head retains the pivot pin of the cover member in the pivot hole of the plate member. The shape may be substantially an elongated oval, a rectangle, a triangle or a square.

The plate member and the cover member may include metal or plastic. The metal may be steel, stainless steel, copper, brass, zinc alloy, or a combination of any of these. The top surface of the cover member may include a marking. The marking may be a word, a logo or a design. The marking may be formed on the top surface of the cover member by printing, etching, die-casting, injection molding or stamping.

The plate member and the cover member may be substantially planar. The plate member may be attachable to a fabric by a thread passing between the plurality of holes disposed between the first end and the second end of the plate member.

In general, in another aspect, the invention features a label including a plate member having a shape, a first end and a second end, the plate member having a plurality of holes therethrough disposed between the first end and the second end, the plate member having a notch disposed adjacent to the second end. A cover member has substantially the same shape as the plate member, a top surface, a bottom surface, a first end and a second end, the cover member having a protrusion configured to engage the notch of the plate member projecting from the bottom surface and disposed adjacent to the second end. A pivot pivotally connects the plate member and the cover member. The cover member is pivotable with respect to the plate member and the shape of the cover member is substantially alignable with the shape of the plate member such that the protrusion of the cover member is engageable with the notch of the plate member.

Implementations of the invention may include one or more of the following features. The pivot may include a pivot pin or a rivet. The shape may be substantially an elongated oval, a rectangle, a triangle or a square. The plate member and the cover member may include metal or plastic. The metal may be steel, stainless steel, copper, brass, zinc alloy, or a combination of any of these.

The top surface of the cover member may include a marking. The marking may be a word, a logo or a design. The marking may be formed on the top surface of the cover member by printing, etching, die-casting, injection molding or stamping.

The plate member and the cover member may be substantially planar. The plate member may be attachable to a fabric by a thread passing between the plurality of holes disposed between the first end and the second end of the plate member.

BRIEF DESCRIPTION OF THE FIGURES

The above-mentioned and other aspects, features and advantages can be more readily understood from the following detailed description with reference to the accompanying drawings wherein.

DETAILED DESCRIPTION OF THE INVENTION

Figure 1:
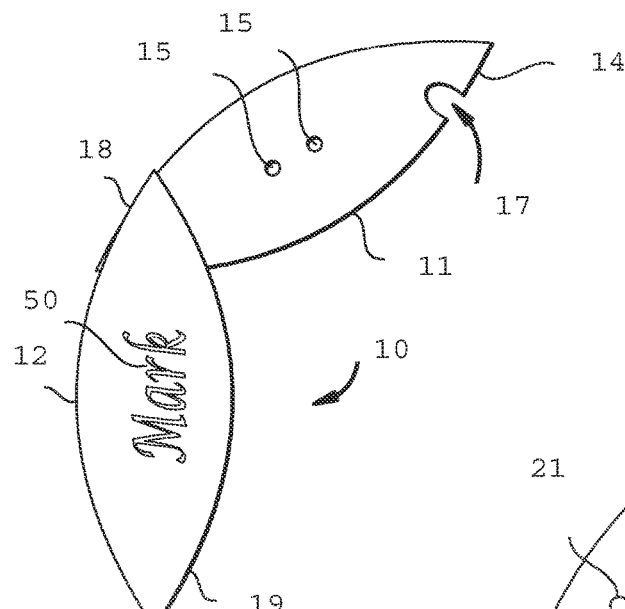
FIG. 1 shows a top view of a label according to an embodiment of the present invention having a pivotable cover member and a plate member in an unaligned configuration.
Figure 2:
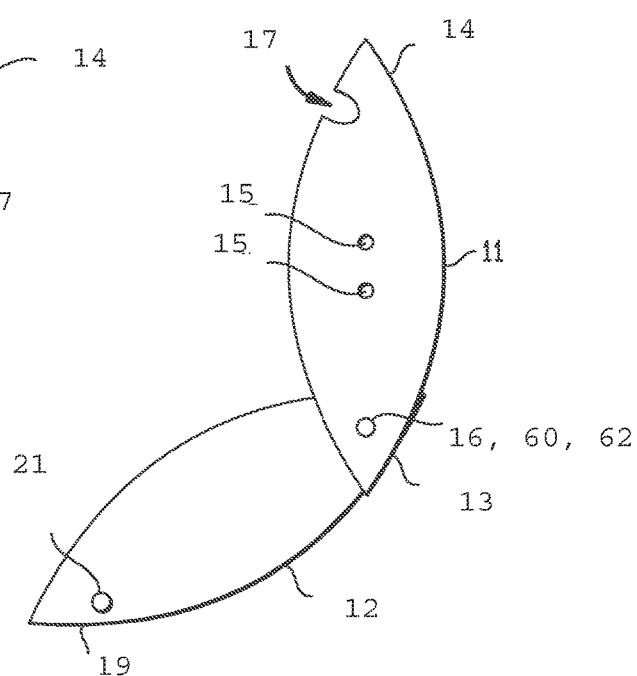
FIG. 2 is a bottom view of the label of FIG. 1.
Figure 3:
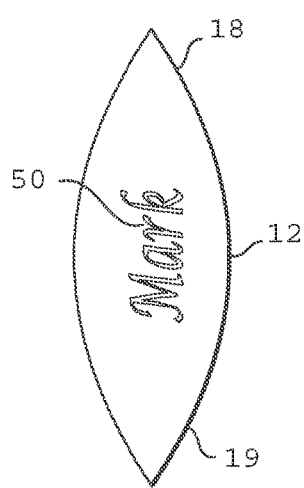
FIG. 3 is a top view of the label of FIG. 1 with the plate member and the cover member in an aligned configuration.
Figure 4:
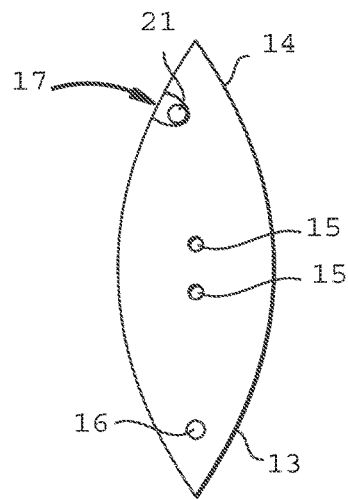
FIG. 4 is a bottom view of the label of FIG. 3.

The present invention provides a pivotable label 10 having a plate member 11 and a cover member 12, as shown in FIGS. 1-4.

Plate member 11 includes a first end 13 and a second end 14 and two or more sewing holes 15 therethrough disposed between first end 13 and second end 14. Plate member 11 also includes a pivot point 16 near first end 13 and a notch 17 near second end 14.

Cover member 12 has a first end 18 and second end 19. Cover member 12 includes a pivot point 20 near first end 18 and a protrusion 21 near second end 19.

Plate member 11 and cover member 12 are pivotally connected to each other by a pivot, which may include a pivot pin or a rivet. Pivot point 16 may be a pivot hole, with pivot point 20 being a corresponding pivot pin 60. Such a pivot pin may be integrally formed with cover member 12 and project from the bottom surface of cover member 12. The pivot pin may further include a head 62. In this arrangement, the pivot pin is rotatably attached to plate member 11 through the pivot hole of plate member 11. The pivot pin head may retain the pivot pin of cover member 12 in the pivot hole of plate member 11.

Pivot points 16 and 20 rotatably or pivotally connect first end 13 of plate member 11 to first end 18 of cover member 12, thereby allowing plate member 11 and cover member 12 to pivot with respect to each another. When plate member 11 and cover member 12 are rotated such that second end 14 of plate member 11 and second end 19 of cover member 12 are aligned, protrusion 21 is received in notch 17.

In this configuration, a marking 50 such as a word, logo or design may be displayed on the top surface of cover member 12. The marking may be formed on the top surface of cover member 12, e.g., by printing, etching or stamping. Further, the mechanism for securing the label to a fabric item, namely sewing holes 15, is obscured by cover member 12 so as not to be visible when cover member 12 and plate member 11 are substantially aligned and protrusion 21 is engaged with notch 17.

Plate member 11 and cover member 12 may be substantially planar. In one embodiment, the shape of plate member 11 and cover member 12 is an elongated oval with pointed ends. Plate member 11 and cover member 12 may have any of a variety of geometric shapes, including a rectangle, a triangle and a square.

The components of label 10, including plate member 11 and cover member 12, may be made of any durable, non-bendable and strong material, such as metal or plastic. Acceptable metals include steel, stainless steel, copper, brass, zinc alloy, or a combination of any of these metals. The metal components may be formed, e.g., by die-casting. Plastic components may be formed, e.g., by injection molding.

In use, plate member 11 is secured to a fabric item by a thread that passes through sewing holes 15. Cover member 12 is then pivoted by pivot points 16 and 20 to substantially align cover member 12 over plate member 11 and to engage protrusion 21 with notch 17.

The embodiments and examples above are illustrative, and many variations can be introduced to them without departing from the spirit of the disclosure or from the scope of the appended claims. For example, elements and/or features of different illustrative and exemplary embodiments herein may be combined with each other and/or substituted with each other within the scope of this disclosure. The objects of the invention, along with various features of novelty that characterize the invention, are pointed out with particularity in the claims annexed hereto and forming a part of this disclosure. For an understanding of the invention, its operating advances and the specific objects attained by its uses, reference should be had to the accompanying drawings and descriptive matter in which there is illustrated a preferred embodiment of the invention.

What is claimed is:

1. A label, comprising:
   a plate member having a shape, a first end and a second end, the plate member having a plurality of holes therethrough disposed between the first end and the second end, the plate member having a pivot hole therethrough adjacent to the first end, and the plate member having a notch disposed adjacent to the second end; and
   a cover member having substantially the same shape as the plate member, a top surface, a bottom surface, a first end and a second end, the cover member having a pivot pin integrally formed therewith and projecting from the bottom surface adjacent to the first end, the pivot pin rotatably attached to the plate member through the pivot hole of the plate member, and the cover member having a protrusion configured to engage the notch of the plate member projecting from the bottom surface normal to a plane of the bottom surface, and disposed adjacent to the second end, wherein a base of the protrusion is in contact with the bottom surface at a portion of the bottom surface spaced from the edge of the cover member;
   wherein the cover member is pivotable with respect to the plate member and is substantially alignable with the plate member such that the protrusion of the cover member is engageable with the notch of the plate member; and
   wherein the cover member substantially obscures the plate member and obscures the plurality of holes when the protrusion of the cover member is engaged with the notch of the plate member.

2. The label of claim 1 wherein the pivot pin includes a head fixedly attached to the pivot pin such that the head retains the pivot pin of the cover member in the pivot hole of the plate member.

3. The label of claim 1 wherein the shape is substantially an elongated oval, a rectangle, a triangle or a square.

4. The label of claim 1 wherein the plate member and the cover member comprise metal or plastic.

5. The label of claim 4 wherein the metal is steel, stainless steel, copper, brass, zinc alloy, or a combination of any of these.

6. The label of claim 1 wherein the top surface of the cover member includes a marking.

7. The label of claim 6 wherein the marking is a word, a logo or a design.

8. The label of claim 6 wherein the marking is formed on the top surface of the cover member by printing, etching, die-casting, injection molding or stamping.

9. The label of claim 1 wherein the plate member and the cover member are substantially planar.

10. The label of claim 1 wherein the plate member is attachable to a fabric by a thread passing between the plurality of holes disposed between the first end and the second end of the plate member.

11. A label, comprising:
    a plate member having a shape, a first end and a second end, the plate member having a plurality of holes therethrough disposed between the first end and the second end, the plate member having a notch disposed adjacent to the second end;
    a cover member having substantially the same shape as the plate member, a top surface, a bottom surface, a first end and a second end, the cover member having a protrusion configured to engage the notch of the plate member projecting from the bottom surface normal to a plane of the bottom surface, and disposed adjacent to the second end, wherein a base of the protrusion is in contact with the bottom surface at a portion of the bottom surface spaced from the edge of the cover member; and
    a pivot pivotally connecting the plate member and the cover member;
    wherein the cover member is pivotable with respect to the plate member and the shape of the cover member is substantially alignable with the shape of the plate member such that the protrusion of the cover member is engageable with the notch of the plate member; and
    wherein the cover member substantially obscures the plate member and obscures the plurality of holes when the protrusion of the cover member is engaged with the notch of the plate member.

12. The label of claim 11 wherein the pivot comprises a pivot pin.

13. The label of claim 11 wherein the pivot comprises a rivet.

14. The label of claim 11 wherein the shape is substantially an elongated oval, a rectangle, a triangle or a square.

15. The label of claim 11 wherein the plate member and the cover member comprise metal or plastic.

16. The label of claim 15 wherein the metal is steel, stainless steel, copper, brass, zinc alloy, or a combination of any of these.

17. The label of claim 11 wherein the top surface of the cover member includes a marking.

18. The label of claim 17 wherein the marking is a word, a logo or a design.

19. The label of claim 17 wherein the marking is formed on the top surface of the cover member by printing, etching, die-casting, injection molding or stamping.

20. The label of claim 11 wherein the plate member and the cover member are substantially planar.

21. The label of claim 11 wherein the plate member is attachable to a fabric by a thread passing between the plurality of holes disposed between the first end and the second end of the plate member.

\* \* \* \* \*